United States Patent
Mills et al.

(10) Patent No.: US 11,262,581 B2
(45) Date of Patent: Mar. 1, 2022

(54) AXIALLY ASYMMETRIC IMAGE SOURCE FOR HEAD-UP DISPLAYS

(71) Applicant: BAE SYSTEMS plc, London (GB)

(72) Inventors: Rory Thomas Alexander Mills, Rochester (GB); Michael David Simmonds, Rochester (GB)

(73) Assignee: BAE SYSTEMS plc, London (GB)

( * ) Notice: Subject to any disclaimer, the term of this patent is extended or adjusted under 35 U.S.C. 154(b) by 36 days.

(21) Appl. No.: 16/754,284

(22) PCT Filed: Oct. 9, 2018

(86) PCT No.: PCT/GB2018/052875
§ 371 (c)(1),
(2) Date: Apr. 7, 2020

(87) PCT Pub. No.: WO2019/077307
PCT Pub. Date: Apr. 25, 2019

(65) Prior Publication Data
US 2021/0132376 A1    May 6, 2021

(30) Foreign Application Priority Data

Oct. 19, 2017 (EP) ..................................... 17275166
Oct. 19, 2017 (GB) ..................................... 1717178

(51) Int. Cl.
*G02B 27/01* (2006.01)
*G02B 26/08* (2006.01)
(52) U.S. Cl.
CPC ..... *G02B 27/0101* (2013.01); *G02B 26/0833* (2013.01); *G02B 2027/0123* (2013.01)

(58) Field of Classification Search
CPC .... G03B 21/008; G03B 21/28; G03B 21/145; G03B 21/208; G03B 21/2013; G03B 21/2033; G03B 21/2053; G02B 27/01; G02B 27/18; G02B 27/0101; G02B 27/0172; G02B 2027/0123; G02B 2027/0125; G02B 2027/0127; G02B 2027/0178; G02B 26/08; G02B 26/0816; G02B 26/0833; G02B 26/0841; H04N 9/315; H04N 9/3105; H04N 9/3126;
(Continued)

(56) References Cited

U.S. PATENT DOCUMENTS

| 6,840,634 B1 | 1/2005 | Chang |
| 2003/0016335 A1* | 1/2003 | Penn .................. G03B 21/2066 353/31 |

(Continued)

FOREIGN PATENT DOCUMENTS

| DE | 102014217180 A1 | 3/2016 |
| WO | 2012088478 A1 | 6/2012 |
| WO | 2019077307 A1 | 4/2019 |

OTHER PUBLICATIONS

International Preliminary Report on Patentability received for PCT Application No. PCT/GB2018/052875, dated Apr. 30, 2020. 9 pages.

(Continued)

*Primary Examiner* — Sultan Chowdhury
(74) *Attorney, Agent, or Firm* — Finch & Maloney PLLC

(57) ABSTRACT

An image projection system utilising a digital mirror device with pivotable mirrors and an asymmetric angular illumination of the mirrors.

20 Claims, 7 Drawing Sheets

(58) Field of Classification Search
CPC .. H04N 9/3161; H04N 9/3164; H04N 9/3173; H04N 9/3197
See application file for complete search history.

(56) References Cited

U.S. PATENT DOCUMENTS

| | | | | |
|---|---|---|---|---|
| 2003/0147158 A1* | 8/2003 | Penn | ................... | G03B 21/008 |
| | | | | 359/833 |
| 2007/0121085 A1* | 5/2007 | Dewald | ................ | H04N 9/3111 |
| | | | | 353/99 |
| 2012/0257282 A1* | 10/2012 | Hudman | .................. | G02B 5/04 |
| | | | | 359/619 |
| 2016/0133201 A1 | 5/2016 | Border et al. | | |
| 2017/0059868 A1 | 3/2017 | Takeda et al. | | |
| 2017/0208302 A1* | 7/2017 | Katsumata | ........... | H04N 9/3114 |

OTHER PUBLICATIONS

International Search Report and Written Opinion received for PCT Application No. PCT/GB2018/052875, dated Nov. 12, 2018. 15 pages.
GB Search Report under Section 17(5) received for GB Application No. 1717178.6 dated Apr. 23, 2018. 3 pages.
Extended European Search Report received for EP Application No. 17275166.1, dated Apr. 13, 2018. 10 pages.

* cited by examiner

AXIALLY ASYMMETRIC IMAGE SOURCE FOR HEAD-UP DISPLAYS

This disclosure relates to head up displays, and in particular image sources for such displays.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user, known as the output pupil. This may be accomplished utilising a waveguide system as shown schematically in cross section in FIG. 1.

Image projection system 11, 12 projects an image into waveguide 10 which couples the image to a user's eye 1 positioned at the output pupil of the system. Waveguide body 10 is optically transmissive such that the user views the real world through the waveguide and the image from the projection system 11, 12 is overlaid onto that view.

The projector optics 12 are arranged to distribute the projected image over an input pupil of the waveguide. The near-field at that pupil represents the spatial distribution of light across the pupil, while the far field represents the image information (each pixel of the image is represented by a discrete ray angle). It is desirable for the image displayed to the user (i.e at the output pupil) to be focussed a long way from the eye (infinity), since this is the likely focus distance of the real world image onto which the projected image is overlaid.

Input grating 13 couples the ray 14 into waveguide body 10. Input grating 13 may be a diffractive grating which diffracts ray 14 to an angle at which it is trapped within the waveguide 10 by total internal reflection. Output grating 15 diffracts light back to its original angles such that it exits the waveguide and propagates to an exit pupil positioned to coincide with the location of eye 1. The output grating 15 may also be a diffractive grating. Waveguide 10 and the input and output gratings 13, 15 are configured to preserve ray direction between the input and output pupils to preserve chromatic and angular image information. That is, the far field of the light at the output pupil matches the far field at the input pupil. Other coupling structures for the input grating 13 and output grating 15 may be utilised, as is known in this technical field.

For clarity in the figures a single ray 14 is shown, but as will be appreciated this is representative of rays at a range of angles. The input light is also spatially distributed and hence ray 14 also represents rays distributed over the exit pupil generated by image projection system 11, 12.

To allow for flexibility in the alignment of the user's eye with the device, the output pupil generated by waveguide 10 should be large enough such that the entire field of view can be seen from a range of locations known as the "eyebox". For example, an output pupil of greater than 10 mm diameter may be desirable. The waveguide system may be designed to expand the input pupil such that the output pupil is larger than the input pupil, thus reducing the input pupil requirements of the image projection system 11, 12. This expansion is commonly known as pupil replication. The expansion should be performed while preserving the far field and maintaining a constant luminance across the near field.

This expansion may be achieved utilising both diffractive structures 15 and 16 in the waveguide 10. The pupil expansion may be provided in either one dimension or two perpendicular dimensions of the pupil, using techniques known in the art.

Pupil expansion in two dimensions presents more of a design challenge than one dimensional expansion. Achieving a uniform illumination across the near-field of the output pupil with 2 dimensional expansion can be difficult, particularly over a large chromatic range, and requires precise design and manufacturing of the waveguide optics.

In contrast single dimension expansion is more straightforward, but limits the available exit pupil size in one dimension to that provided by the projection source. FIG. 2a shows a schematic diagram of an input pupil 200 being expanded in a waveguide 201 in only one dimension. The output pupil 202 has been expanded in the x-direction, but in the y-direction the pupil size is maintained, leading to asymmetric eye box 203. As a consequence when combining a single dimension expansion waveguide with a projection device, the exit pupil provided by the projector should typically be larger in the orthogonal axis to the waveguides expansion, as shown in FIG. 2b for input pupil 204, waveguide 205 for 2D expansion, and output pupil 206, providing symmetric eye box 207.

Reflective microdisplay devices can be used in conjunction with other complex optical elements that may be used to create a suitably large exit pupil, however such systems can become physically large and invoke a degradation in achievable image quality.

FIG. 3 shows a schematic diagram of a single DMD mirror 300 illuminated by an input cone 301. The mirror is shown in the flat-state in which it produces an output cone 302. The mirror 300 tilts around an axis 303 perpendicular to the plane of the drawing. In the on-state the mirror 300 is tilted anti-clockwise to produce output cone 304. In the off-state the mirror tilts clockwise and produces an output cone 305. The style of DMD shown in FIG. 3 is often known as a "diamond pixel" architecture. In other types of DMD each mirror is moveable about a point such that the mirror surface moves along multiple axes between states; such DMD devices are commonly known as "tilt and roll" devices.

Only the on-state output cone 304 should be collected by the image projection optics, and hence the output cone 304 should not overlap with the flat- and off-state output cones 302, 305. A typical mirror of a DMD device such as that of FIG. 3 can tilt by +/−12°, meaning that in order to avoid overlap between adjacent output cones the maximum illumination cone angle is 24° (+/−12°). Illumination of a DMD is across the total area of the micro-mirror device, which defines the Field of View achievable by the projection system. The illumination cone angle defines the pupil size of the projection system. That is, the projection optics after the DMD translate the spatial distribution of light into angular distribution (the far field) and the angular distribution into a spatial distribution such that an eye located at the output pupil sees the image created by the DMD.

FIG. 4 shows a paraxial design of a DMD-based image projector for creating an exit pupil 400. The DMD is represented at 401. The top half of the figure shows the X-axis of the DMD 401 (in which the device is larger) and the bottom half of the figure shows the Y-axis of the DMD 401 (in which the mirror array is smaller.

The DMD 401 is uniformly spatially illuminated with light over an angular illumination cone by a light source (not shown). Ray bundles 402 and 403 represent reflections from the central region of the 401, and ray bundles 404-407 represent reflections from the edges of the 401. The cone angle of bundles 402-407 corresponds to the cone angle of the illumination source at the DMD plane 401.

Paraxial lens system 408 focusses the light from the DMD to form an exit pupil 400.

In an example configuration the DMD array 401 may be 10 mm×6.25 mm. An optical system may be designed to illuminate the whole DMD array 301 to consequently provide a 40°×25° Field of View through the projection lens. Using the maximum illumination cone angle of 24° this provides an exit pupil 300 of 6 mm diameter.

Using expansion in one dimension in the waveguide system limits the example system output pupil (eye box) to 6 mm in the unexpanded dimension, which may be insufficient, thus necessitating two dimensional expansion.

There is therefore a requirement for an improved head up display system for providing a suitably sized output pupil.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an image projection apparatus for a head up display, the apparatus comprising a digital mirror device comprising a plurality of pivotable mirrors; an illumination source configured to illuminate the pivotable mirrors with incident light distributed spatially across the mirrors and angularly across an input cone; and an optical waveguide aligned such that light from the illumination source is coupled into the waveguide after reflection from the pivotable mirrors wherein the input cone is asymmetric and has a larger cone angle in an axis than the maximum tilt angle of the pivotable mirrors in that axis.

The pivotable mirrors may pivot on a single axis.

The pivotable mirrors may be four-sided in plan view and pivot about an axis between two vertices of the mirror perimeter.

The digital mirror device may be a diamond pixel device.

The input cone angle may be 24° along the axis orthogonal to the mirror pivot axis and may be greater than 24° along the axis parallel to the mirror pivot axis The image projection apparatus for a head up display may further comprise a lens arrangement to project the output of the digital mirror device to an output pupil, wherein the output pupil is spatially asymmetric.

The image projection apparatus may project its output into a waveguide for coupling to an output pupil of the display.

The waveguide may expand the input pupil via pupil replication, to provide a larger exit pupil to a user.

The disclosure provided here may provide waveguides which are smaller and lighter than other waveguide designs, but which do not produce stray light paths.

BRIEF DESCRIPTION OF THE DRAWINGS

Embodiments of the invention will be described, by way of example, with reference to the following drawings, in which.

DETAILED DESCRIPTION

Figure 1:
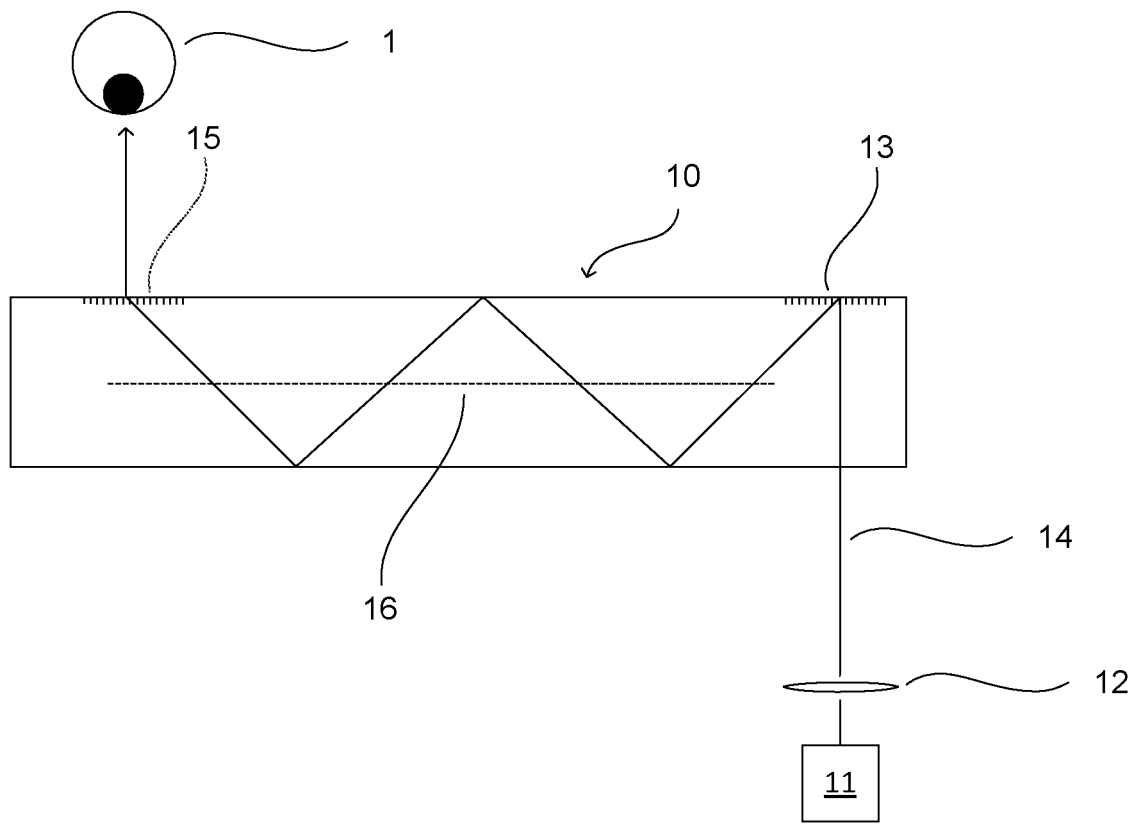
FIG. 1 shows a cross-section of a waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 5:
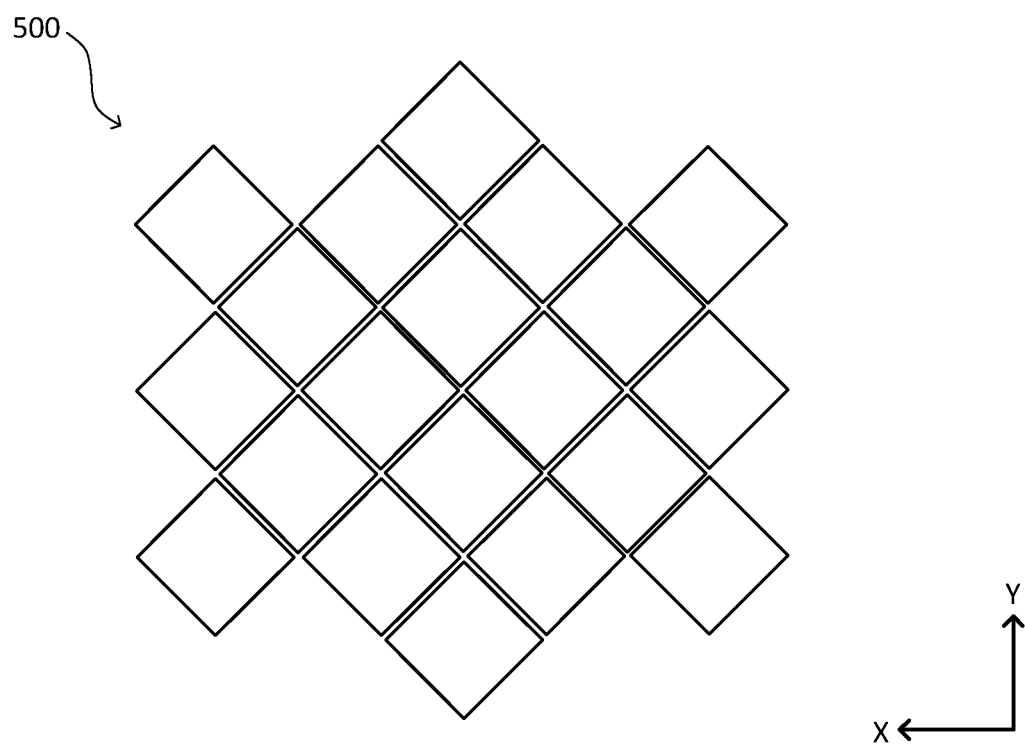
FIG. 5 shows a schematic diagram of a DMD array.
Figure 6:
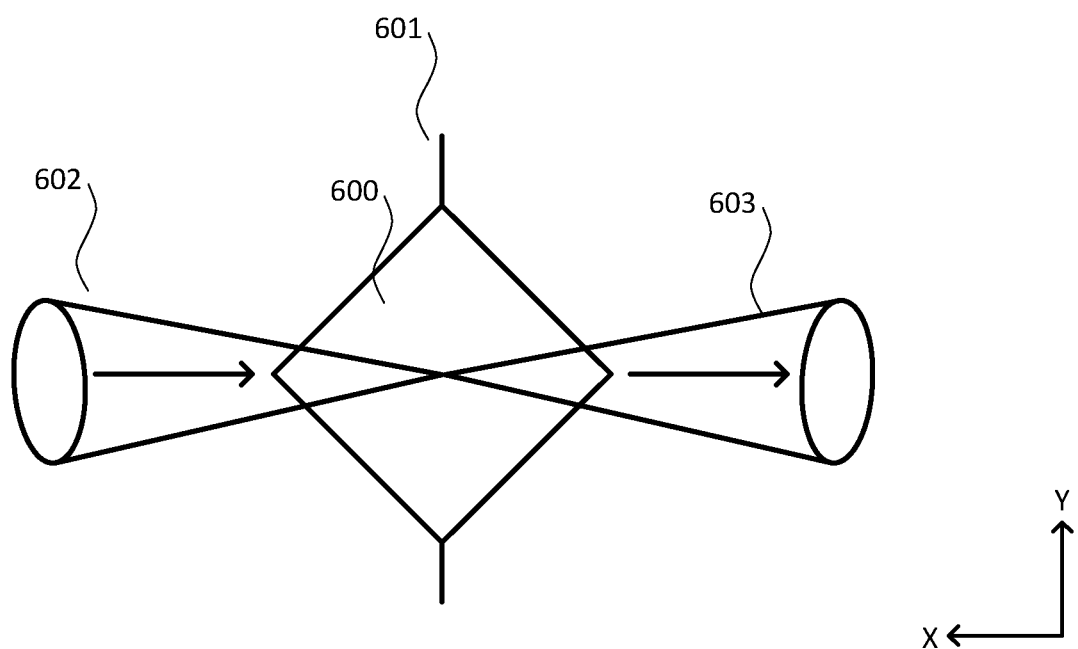
FIG. 6 shows a single mirror from a DMD array.

FIG. 5 shows a plan view of a DMD array 500 in which the tilt axis of each mirror is about a corner-to-corner line of symmetry and in which the mirror tilts around a single axis. This type of DMD is an example of a type of device which may be used in the current disclosure, but other types of DMD array may also be utilised. For example, DMDs in which the mirrors pivot on a single axis, but with different alignment of the axis may be utilised, or DMDs in which the mirror pivots about more than one axis may be utilised. FIG. 6 shows an enlarged view of a single mirror 600 and its pivot axis 601 along the Y-axis. The mirror 600 is illuminated by input cone 602 and cone 603 represents the output cone.

Figure 7:
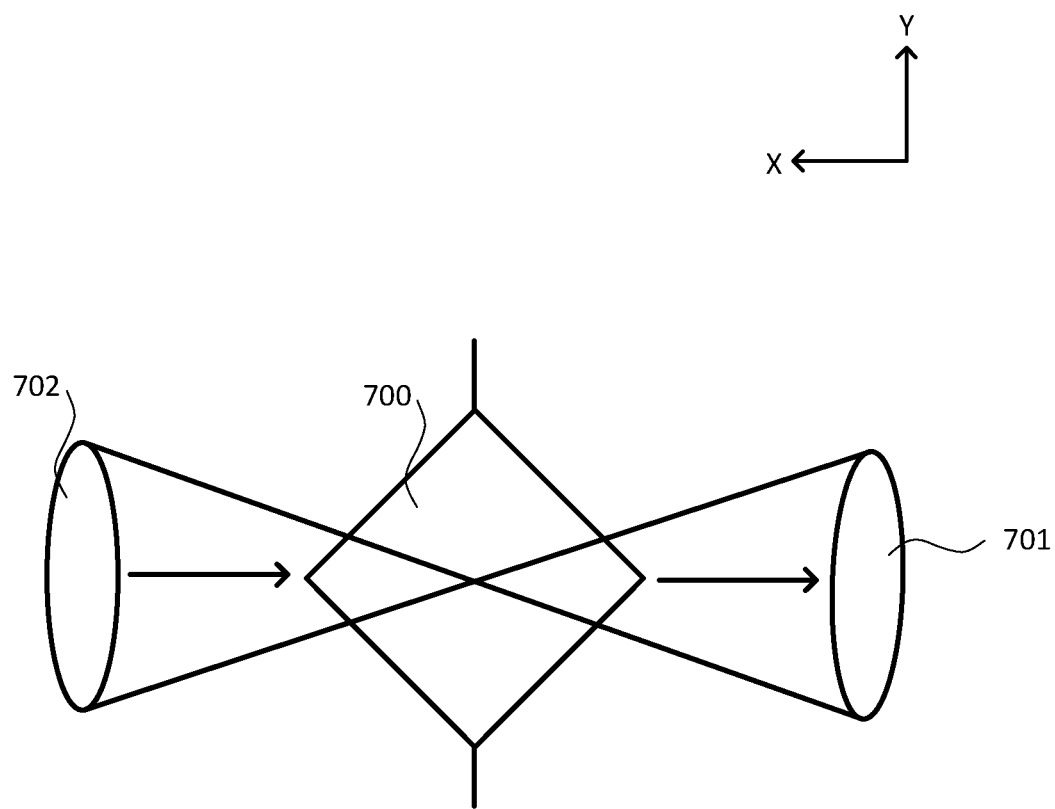
FIG. 7 shows a single mirror from a DMD array with asymmetric illumination.
Figure 8:
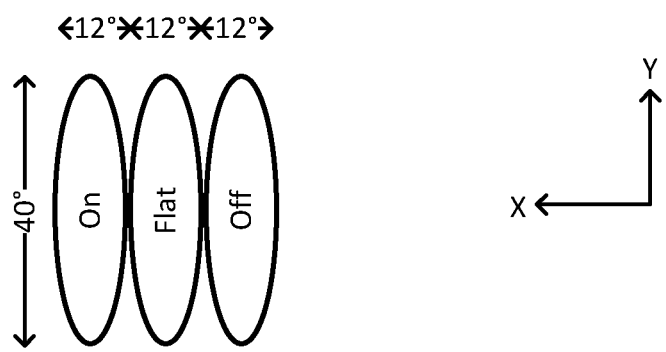
FIG. 8 shows output pupils from a DMD mirror with asymmetric illumination.

FIG. 7 shows a schematic diagram of a single mirror 700 of an array illuminated to create an asymmetric output pupil 701. The input illumination cone 702 is arranged to be asymmetric. In the Z axis (out of the drawing plane) the input cone is constrained to the 24° described hereinbefore, such that there is no overlap between on/flat/off output cones. The illumination cone is asymmetric such that the cone angle parallel to the Y-axis is larger than the cone angle in the Z-axis. Due to the orientation of this configuration there is no requirement to angularly limit the output pupil size (other than depending on conventional optical design limitations). In an example configuration the illumination cone may be 24°×40°. In general the cone angle in an axis may be larger than the maximum mirror tilt angle in that axis. In a specific example the mirror tilts around only one axis. FIG. 8 shows the output pupils for each of the mirror states, showing the enlarged pupil in the Y-direction while maintaining a lack of interaction between states in the X-direction. In an example the mirrors pivot around the Y-axis of FIG. 7, with no movement about other axes.

Figure 2A:
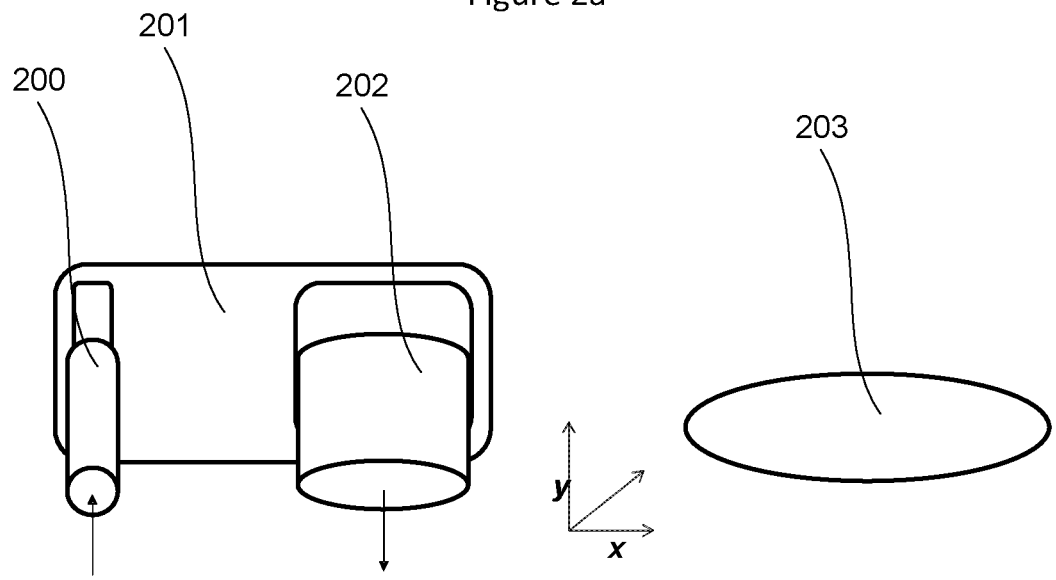
FIG. 2 shows a schematic diagram of one and two dimension expansion.
Figure 2B:
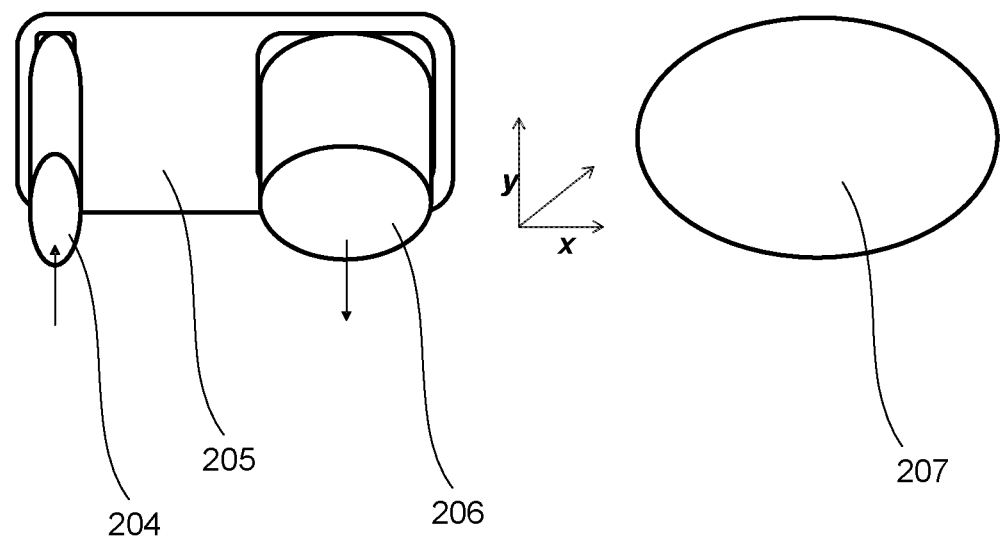
Figure 3:
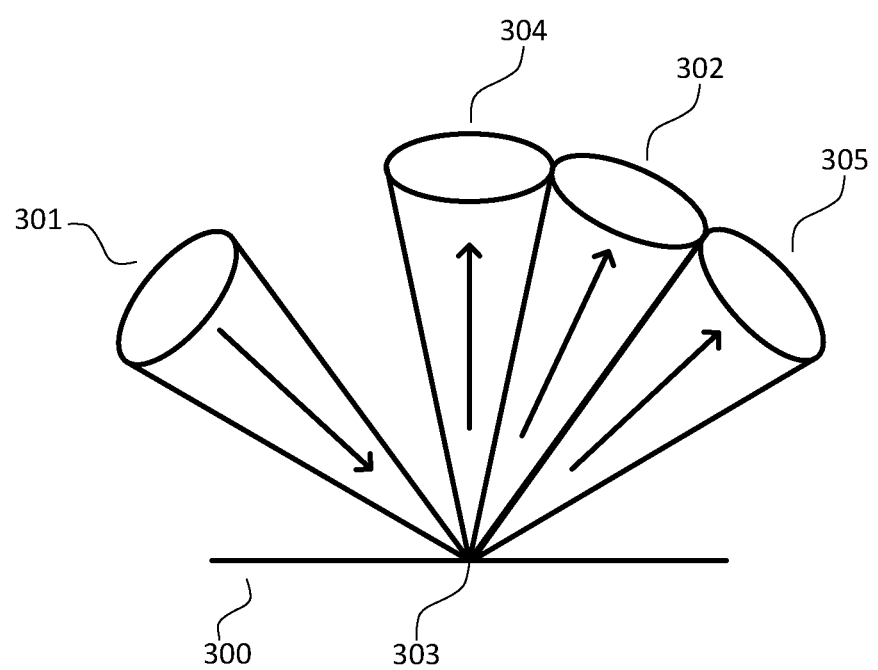
FIG. 3 shows a schematic diagram of reflections from a DMD mirror.
Figure 4:
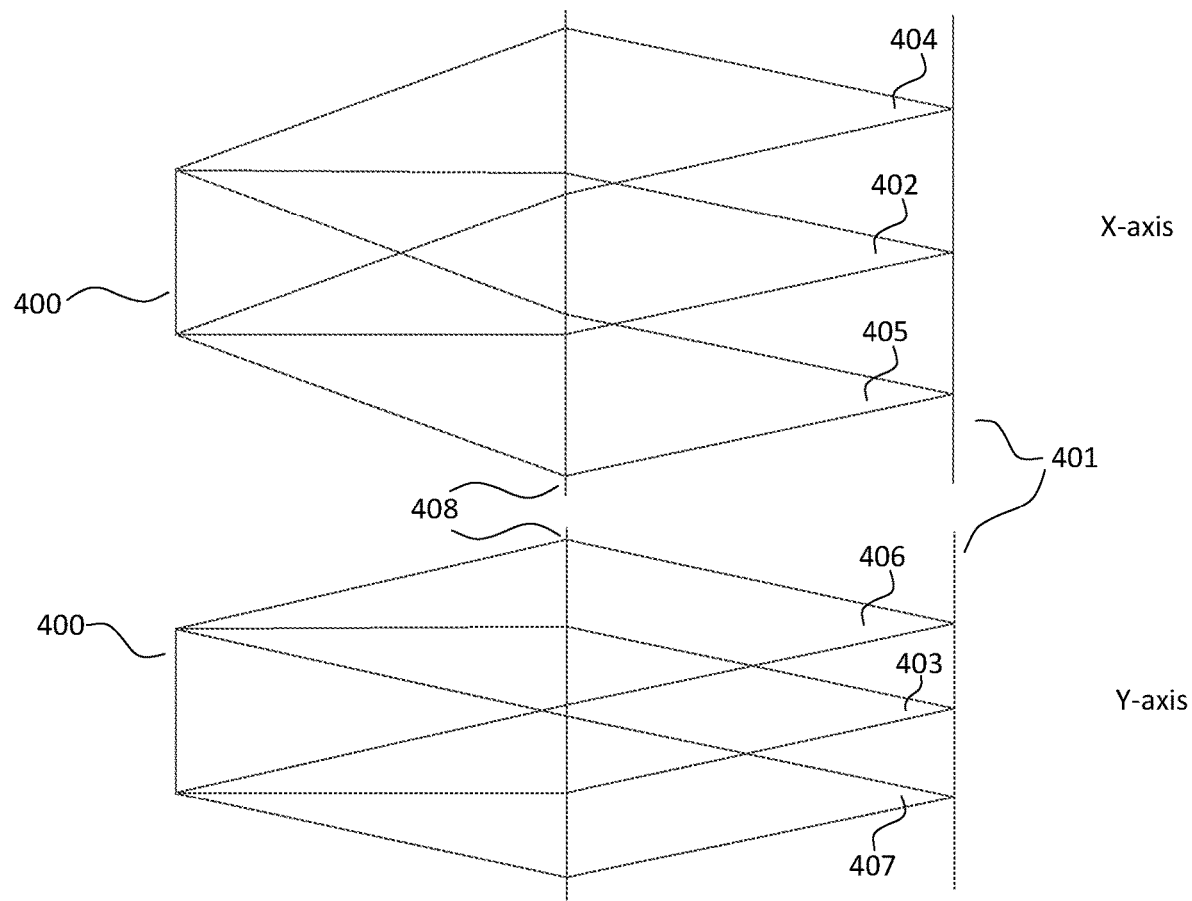
FIG. 4 shows a paraxial projection system.
Figure 9:
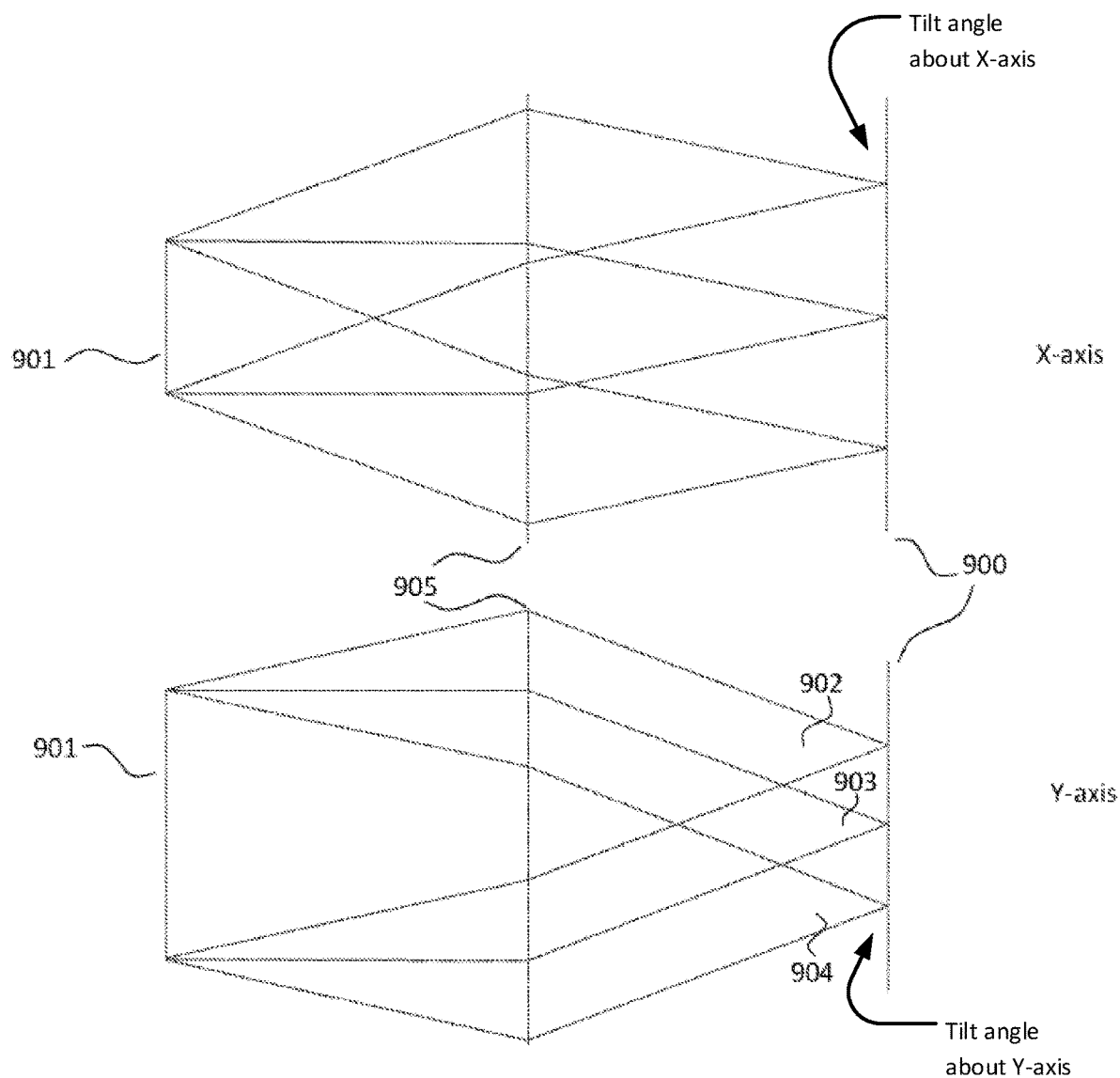
FIG. 9 shows a paraxial projection system with asymmetric illumination.

FIG. 9 shows a paraxial system utilising the asymmetric illumination described above. The DMD device 900 has the same dimensions as described in relation to FIG. 2 and the same Field of View of 40°×25° is provided at output pupil 901. In the X-Axis the illumination angle is the same as described in relation to FIG. 3, 24°, but in the Y-Axis exemplary ray bundles 902, 903, 904 have a larger cone angle, for example 40°. Paraxial projection system 905 provides a paraxial exit pupil 901 of 6 mm×10.25 mm.

The asymmetric output pupil 901 of FIG. 9 may be projected into a waveguide of a HUD for projection to the user. Expansion in only one dimension may be provided by the waveguide to provide an output pupil for the system of 20 mm (expanded from 6 mm)×10.25 mm. Expansion in only one dimension may thus provide an acceptable output pupil size. A DMD image source system (with the associated benefits in brightness) may thus be utilised in combination with one dimension expansion, thus obtaining the benefits of these technologies.

The above description has been given using an example DMD device with specific parameters. Those parameters are given for convenience of description only and the principles described herein apply to devices with different parameters.

In the above description a side-diamond device has been used as an example, However, other types of device in which the mirrors pivot may be utilised according to the same principles. Similarly square-shaped mirrors have been used as an example, but other shapes may also be utilised.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An image projection apparatus for a head up display, the image projection apparatus comprising:
   a digital micromirror device comprising a plurality of pivotable mirrors configured to tilt about a first axis;
   an illumination source configured to illuminate the pivotable mirrors with incident light distributed spatially across the mirrors and angularly across an input cone; and
   an optical waveguide aligned such that light from the illumination source is coupled into the waveguide after reflection from the pivotable mirrors;
   wherein an angle of the input cone with respect to a second axis is no more than twice a maximum tilt angle of the pivotable mirrors about the first axis, the second axis being orthogonal to the first axis.

2. The image projection apparatus for a head up display according to claim 1, wherein the pivotable mirrors pivot on a single axis.

3. The image projection apparatus for a head up display according to claim 2, wherein the pivotable mirrors are four-sided in plan view and pivot about an axis between two vertices of the mirror perimeter.

4. The image projection apparatus for a head up display according to claim 3, wherein the digital micromirror device is a diamond pixel device.

5. The image projection apparatus for a head up display according to claim 2, wherein the angle of the input cone is 24° along the second axis axis and greater than 24° along an axis parallel to the first axis.

6. The image projection apparatus for a head up display according to claim 1, further comprising a lens arrangement to project an output of the digital micromirror device to an output pupil, wherein the output pupil is spatially asymmetric.

7. A head up display comprising the image projection apparatus according to claim 1, wherein the waveguide is configured to enlarge a size of an exit pupil created by the digital micromirror device illumination in a first dimension relative to a second dimension.

8. A head up display comprising the image projection apparatus according to claim 1, wherein the waveguide is configured to enlarge a size of an input pupil via pupil replication in a first dimension relative to a second dimension.

9. An image projection apparatus for a head up display, the image projection apparatus comprising:
   a digital micromirror device comprising a pivotable mirror configured to tilt around a first axis, the pivotable mirror having a maximum tilt angle equal to X° with respect to the first axis;
   an illumination source configured to illuminate the pivotable mirror with an input cone of light, wherein an angle of the input cone of light is with respect to a second axis is no more than 2X°, the second axis being orthogonal to the first axis; and
   an optical waveguide aligned such that light from the illumination source is coupled into the waveguide after reflection from the pivotable mirror.

10. The image projection apparatus for a head up display according to claim 9, wherein the pivotable mirror pivots on a single axis, the single axis being the first axis.

11. The image projection apparatus for a head up display according to claim 9, wherein the pivotable mirror is four-sided in plan view and pivots on a single axis that passes through two vertices of the pivotable mirror perimeter, the single axis being the first axis.

12. The image projection apparatus for a head up display according to claim 11, wherein the digital micromirror device is a diamond pixel device.

13. The image projection apparatus for a head up display according to claim 9, wherein the maximum tilt angle is 12° to either side of the first axis, and the cone angle along the second axis is 24°, and the cone angle along a third axis parallel to the first axis is greater than 24°.

14. The image projection apparatus for a head up display according to claim 9, wherein the cone angle along the second axis is 2X°.

15. The image projection apparatus for a head up display according to claim 9, wherein the cone angle along a third axis parallel to the first axis is greater than 2X°.

16. A head up display comprising the image projection apparatus according to claim 9, wherein the waveguide expands an exit pupil in one axis, the exit pupil created by illumination of the digital micromirror device.

17. A head up display comprising the image projection apparatus according to claim 9, wherein the waveguide expands an input pupil via pupil replication in a single dimension, to provide a larger exit pupil.

18. An image projection apparatus for a head up display, the image projection apparatus comprising:

a digital micromirror device comprising a pivotable mirror, the pivotable mirror having a maximum tilt angle about equal to X° with respect to a first axis;

an illumination source configured to illuminate the pivotable mirror with an input cone of light, wherein an angle of the input cone of light is with respect to a second axis no more than 2X°, the second axis orthogonal to the first axis; and a lens arrangement to project an output of the digital mirror device to an output pupil, wherein the output pupil is spatially asymmetric.

19. The image projection apparatus for a head up display according to claim 18, wherein the pivotable mirror pivots on a single axis, the single axis being the first axis, and wherein the cone angle along a third axis parallel to the first axis is greater than 2X.

20. A head up display comprising: the image projection apparatus according to claim 18; and an optical waveguide into which the output pupil is projected into the waveguide.

* * * * *